W. P. & S. G. THOMSON.
RAIL JOINT.
APPLICATION FILED DEC. 27, 1907.

967,687.

Patented Aug. 16, 1910.

3 SHEETS—SHEET 1.

WITNESSES
W. W. Swartz
H. M. Corwin

INVENTORS
W. P. Thomson,
S. G. Thomson,
by Bakewell, Byrnes & Parmelee,
their Attys.

W. P. & S. G. THOMSON.
RAIL JOINT.
APPLICATION FILED DEC. 27, 1907.
967,687.
Patented Aug. 16, 1910.
3 SHEETS—SHEET 3.
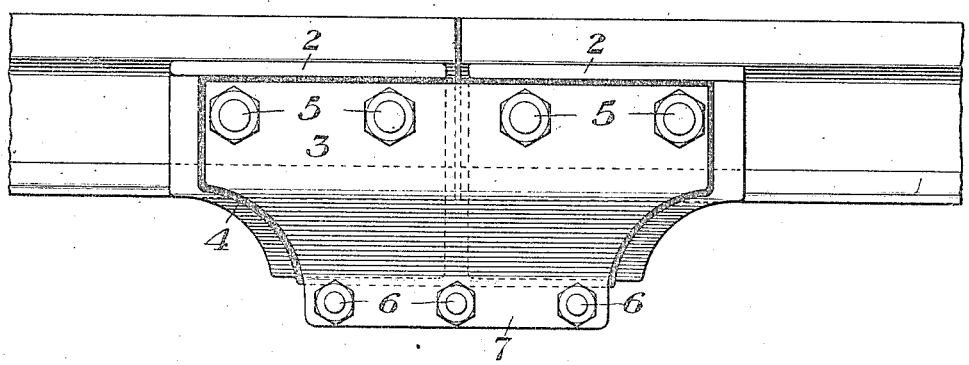
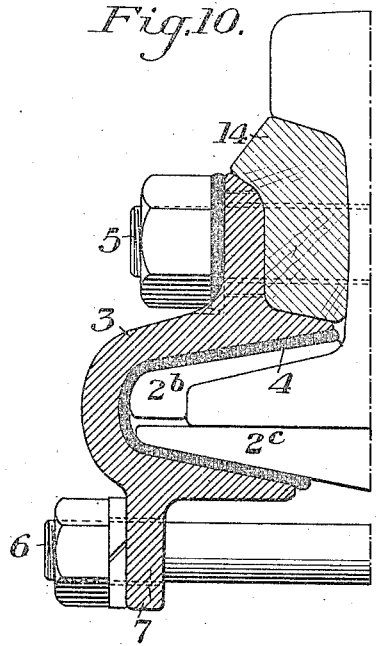
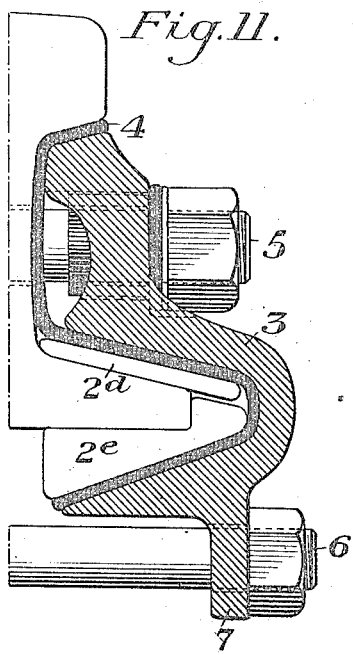
WITNESSES
R A Balderson
W. W. Swartz
INVENTORS
W. P. Thomson
S. G. Thomson,
by Bakewell, Byrnes & Parmelee,
their Attys.

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

967,687.

Specification of Letters Patent.  Patented Aug. 16, 1910.

Application filed December 27, 1907. Serial No. 408,295.

*To all whom it may concern:*

Be it known that we, WILLIAM P. THOMSON and SAMUEL G. THOMSON, of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which—

Figure 1:
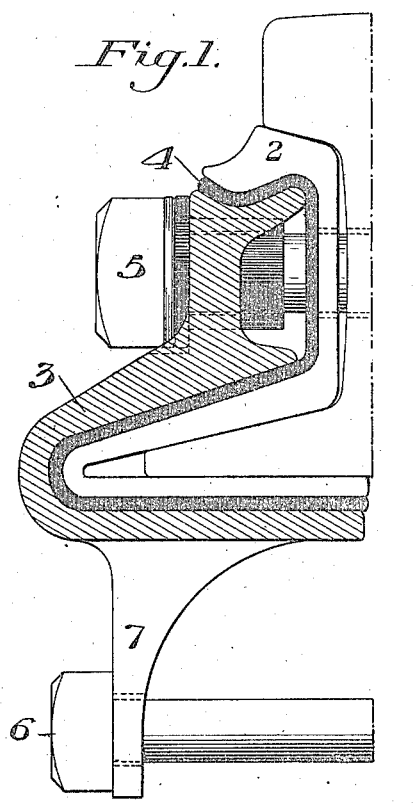
Figure 2:
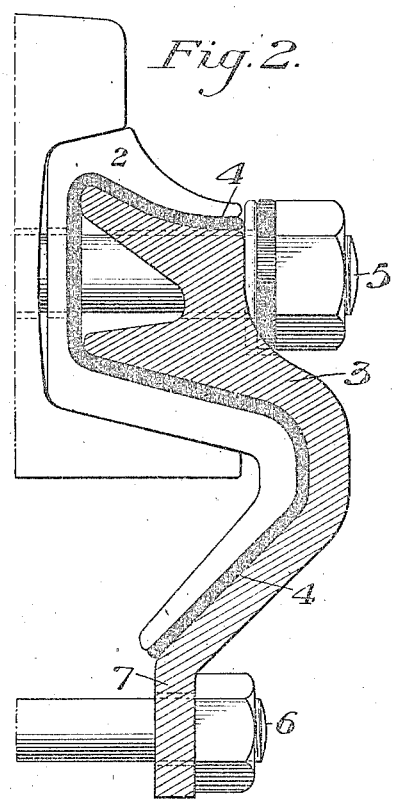
Figure 3:
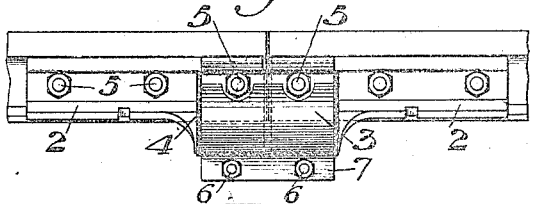
Figure 4:
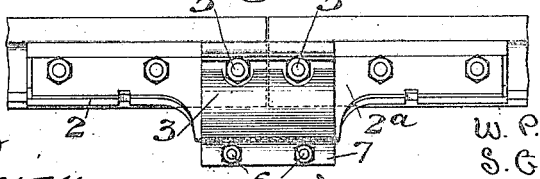

Figures 1 and 2 are sectional views, showing two different forms of our invention. Fig. 3 is a side view of one form of our joint. Fig. 4 is a similar view showing a non-insulated joint embodying our invention; Figs. 5, 6, 7 and 8 are sectional views showing other modifications; Fig. 9 is a side elevation of a joint having a section similar to that shown in Fig. 2, and Figs. 10 and 11 are sectional views of still other modifications.

Our invention has relation to rail joints and is designed to provide a joint in which the bearing surface at the rail end is increased beyond the edge of the rail base or foot by the use of inside bars, in combination with outside bars, in the peculiar manner hereinafter described and claimed.

The precise nature of our invention will be best understood by reference to the accompanying drawings, in which we have shown a number of modifications which will now be described, it being premised, however, that the invention is susceptible of various other modifications without departing from the spirit and scope of the invention as defined in the appended claims.

In the drawings, the numeral 2 wherever seen designates the inner plates or bars, 3 the outer plates or bars, 4 the insulating material, and 5 and 6 joint bolts, the bolts 6 being below the rail bases, while the bolts 5 extend through the web portions of the rails.

In the form shown in Fig. 1, the inside bar 2 is shown as having an extension under the head of the rail, which bears upwardly against the same, and is extended outwardly beyond the plane of the outer face of the rail head, so as to provide an extended bearing surface at its under side for the insulation 4, which is clamped between such extension and the top portion of the outer bar 3. The bar 2 also has an extension underneath the base of the rail. The insulation 4 extends continuously between the inner and outer bars throughout their entire extent.

The modification shown in Fig. 2 is similar to that shown in Fig. 1, except that those portions both of the inner and outer bars which extend below the rail base, instead of being brought horizontally underneath the base, are inclined inwardly and downwardly, as shown, to form flexible bearing surfaces and to increase the stiffness of the bars.

Fig. 3 shows in side elevation the set of inside bars, one contacting with each rail, and separated from each other adjacent to the joint between the rails, while the outer bar extends continuously across the joint with the insulation between the inside and outside bars. The separation of the inner bars at the ends of the rails is necessary in all cases where an insulating joint is desired. When, however, the insulation is not desired, but the joint is intended for use in ordinary track service, the inside bar may extend continuously as shown at 2ª in Fig. 4. By making the inside bars of greater length than the outside bars, so that they will extend over the ties proper, spiking facilities are provided.

Figure 5:
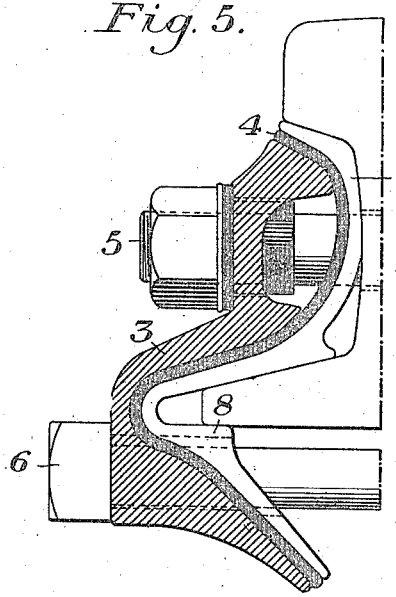

Fig. 5 shows a form of the inside bar which does not extend outwardly beyond the head of the rail at its upper end and which affords a practically continuous insulating bearing surface between the head and foot of the rail. This form of joint also includes a large foot extension at the edge of the base of the rail and a depending flange to afford stiffness and a flexible bearing face, while at the same time it has a portion 8 which extends horizontally inward underneath the base of the rail, so that it combines the functions of the lower portions shown in Figs. 1 and 2.

Figure 6:
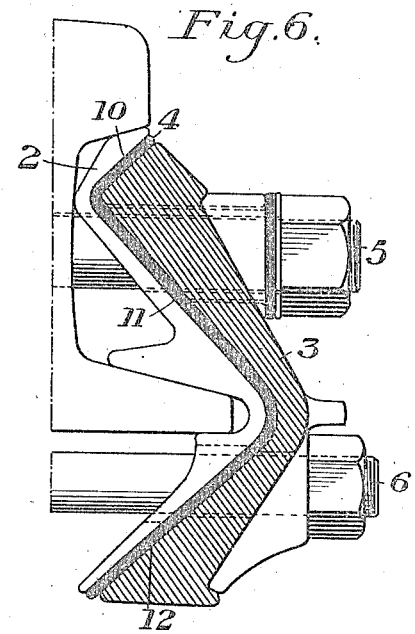

The form of joint shown in Fig. 6, is similar to that shown in Fig. 5, except that the inside bar does not contact continuously with the rail between its head and base and has broad flat bearing surfaces 10, 11 and 12, for the insulation, at approximately right angles to each other.

Figure 7:
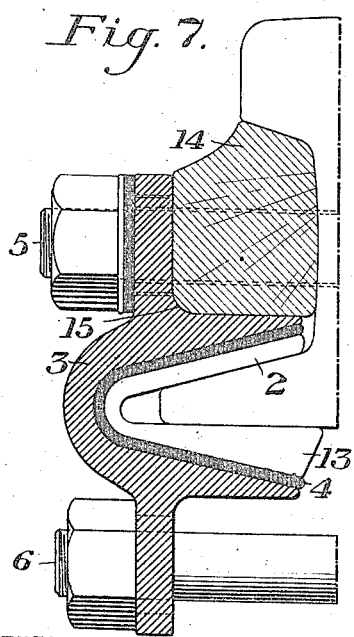

Fig. 7 shows a form of invention in which the inner bar has a broad foot portion 13, which extends horizontally inward underneath the base of the rail and which is of gradually increasing thickness toward its free end. This inside bar does not extend upwardly along the web of the rail, as in the preceding figures, but a block of wood or other insulating material 14 is fitted underneath the head of the rail and is carried by the angle or upper portion 15 of the outer bar. This outer bar clamps the insulation against the inner bar both above and below the rail base, forming, in effect, a jaw bar with bolting faces extending both upwardly and downwardly adjacent to the edge of the rail base and forming a deep stiffening girder.

Figure 8:
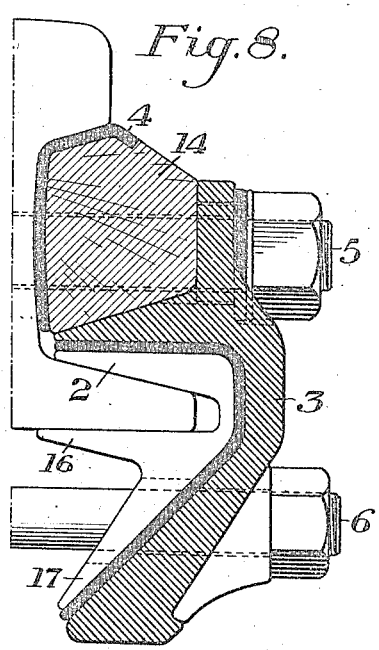

The form shown in Fig. 8 is similar to that shown in Fig. 7, except that insulation is shown between the block 14 and the web of the rail, and the further fact that the lower portion of the inner bar has one member 16, which extends horizontally underneath the rail base and another downwardly and inwardly extending member 17, through which the bolts 6 extend.

Fig. 9 shows a side elevation of a joint having a section similar to that of Fig. 2, but showing a different length and proportion of the inner and outer bars, from that shown in Fig. 3. In this arrangement the outside bar is more nearly equal in length to the length of the two inner bars taken together.

The form shown in Fig. 10 is in general very much like that shown in Fig. 7 except that the inside plates or bars are formed in two sections 2$^b$ and 2$^c$, one section fitting over the top of the rail base and against its outer edge, while the other section extends under the foot or base of the rail. These plates afford wide surfaces and large radii for contact with the insulation. Either of the bars 2$^b$ or 2$^c$ may, however, be used without the other. If desired, the portions 2$^c$, which lie underneath the rail base, may be carried all the way underneath the rail base, so as to project at the opposite side.

The form shown in Fig. 11 is similar to Fig. 10, except that the two parts of the inner plate or bar are of different forms. The portion 2$^d$ which fits the top of the rail base is of flat plate form, while the portion 2$^e$ which lies underneath the rail base, is shaped to fit the edge of the rail base, as well as its under side. This form of the member 2$^e$ is more particularly adapted for use where it is not intended to extend entirely underneath the rail base, but with a separate base at each side of the rails. In this form, the filler block 14 is not employed, but the outer bar is carried up under the head of the rail in the manner of the ordinary splice bar with intervening insulation.

In all the forms shown, the foot portion of the outer bar is provided with a depending bolting flange or projection for the bolts 6, these flanges being shaped and the metal thereof disposed to form vertical bolting faces.

The advantages of our invention result from the use of the inner and outer bars in the manner described, whereby broad bearing surfaces extending beyond the edge of the rail base are provided for the insulation and its cutting or crushing is precluded. Our invention also enables us to grip the foot of the rail on broad surfaces to such an extent that the support and bearing of the splice bar under the head is not essential, permitting the use of filler blocks in the manner described or such other filling material as may protect the inside parts from the weather. Our invention also permits the use of very stiff outer bars which are at the same time not sufficiently rigid in form to destroy the insulation. Its destruction is further prevented by the flexible form of the bearing faces of the inside bar.

We propose to reduce the amount of insulation necessary by using metallic plates between the inner and outer bars at one rail end, which plates shall be interchangeable with similar insulating filler plates between the bars at the other rail end. Thus, the insulation shown in Figs. 1 and 2 may be supplanted at one rail end by these metallic liners or plates of similar form.

One of the fundamental principles of the inside base extension of the inner bar or plate is that it provides an additional wide bearing face below the base of the rails which acts directly with each rail, due to the fact that the bar has a bearing over and under a portion of the rail and must move with it. The importance of this action of the separate inside plates having these bearings on the separate rails will be clearly seen when it is realized that the upper bearing surface of the bar or plate at one end assists the under face of the bar at the other rail end, and vice versa, as the shearing strains caused by the passing load are transmitted from one rail to the other. We still further provide against destruction of the insulation by extending these lower faces downwardly at an angle in the more preferred forms of the invention. This gives very springy bearing surfaces and places the metal in the outer bar in the most economical position to give maximum stiffness to the joints.

In the forms of our invention where the bars take a bearing under the heads of the rails, it is obvious that the insulation between these wide base extension bearings has to be crushed before the insulation under the head would be destroyed, and as the wide base bearings are all very flexible, the result is the safest possible arrangement for a joint having insulation placed under the heads of the rails. The flexible inside extension plates also act to relieve the shocks received by the parts in service.

We claim:

1. In a rail joint, an inner and an outer bar each of which extends over and around and under the rail base, and interposed insulation bearing continuously outside the rail base on each of said inner and outer bars, the inner bar having a portion which is adjacent to and between the outer edge of the rail base and the adjacent portion of the outer bar, said portion forming in effect a transverse extension of the rail base to an extent greater than the sectional thickness of said portion at the outer edge of said base to thereby cause the area of the insulation bearing surface on either of the two bars to be materially greater than the area of the surfaces of the base flange of the rail which are opposite to said insulation bearing surfaces.

2. In a rail joint, a metallic inner bar having a portion to extend under the rail foot and another portion to contact with the top surface of the foot of one rail only and a third portion to lie outside the rail foot, said third portion having an outwardly extending face on its under side of greater width than the least sectional thickness of said third portion.

3. In a rail joint, an inner and an outer bar, and interposed insulation bearing continuously outside the rail base on each of said bars, said bars extending over and under the rail base and each bar having insulation bearing faces above and below the rail base which diverge inwardly at a wider angle than the angle at which the top and bottom faces of the adjacent base flange of the rail diverge.

4. In a rail joint, a bar contacting with the foot of one rail only, said bar contacting with the rail above its bottom face and having a member extending beyond the outer edge of the rail foot to provide a seat for insulating material on its under side.

5. In a rail joint, insulating material, and a bar or plate to contact with one rail only and to have a bearing face for said insulating material on its under side at an angle to the horizontal below the rail base.

6. A rail joint having inner and outer bars on the same side of the rails and insulation between them, said inner bar contacting with one rail only and having an insulation bearing member with a face extending downwardly at an angle to the horizontal below the rail base.

7. In a rail joint, bearing bars or plates contacting with the rail and having outer bearing faces wider than the corresponding faces of the rail, insulating means and a splice bar or plate having a central recess with a lower insulating bearing face extending at an angle to the horizontal to inclose and clamp to the rail said intervening insulation and bearing bars.

8. A rail joint having an outer and an inner bar insulated from each other and a block interposed between the outer bar and the head and the web of the rail, said inner bar extending outwardly beyond the outer edge of the rail base.

9. A rail joint having an outer clamping bar inclosing and insulated from an inside bar contacting with one rail and having a bearing face below the rail base at an angle to the horizontal, said outer bar also engaging a block interposed between it and the head and web of the rail.

10. In a rail joint, inner and outer bars, insulation between them and bolts holding said parts together above and below the rail base, said inner bar contacting with one rail only and forming a seat at an angle to the horizontal for the outer bar and the intervening insulation beyond the outer edge of the rail base.

11. In a rail joint, an inner bar or plate to contact with the foot of one rail, an outer bar, and insulating material between said bars said inner bar contacting with the rail above the bottom face of its foot.

12. In a rail joint, a metallic bar contacting with one rail only and extending over and under the rail base, said bar having the upper side of its member directly opposed to the upper side of the rail base and the under side of its member directly opposed to the under side of the rail base constituting broad contacting surfaces for insulating material which diverge inwardly at a wider angle than the angle at which the top and the bottom faces of the adjacent base flange of the rail diverge.

13. In a rail joint, a metallic bar contacting only with the foot of one rail and extending over and under the rail base, said bar having on its upper and under sides contacting surfaces for insulating material which diverge inwardly at a wider angle than the angle at which the top and bottom faces of the adjacent base flange of the rail diverge.

14. In a rail joint, an inner bar, an outer bar, and interposed insulating material, said inner bar projecting beyond the outer edge of the rail foot to a greater distance than the least sectional thickness of said inner bar.

15. In a rail joint, an inner bar, an outer bar, and interposed insulating material, said inner bar projecting beyond the outer edge of the rail foot to a greater distance than the sectional thickness of said inner bar at the outer edge of the rail foot.

16. In a rail joint, an inner bar, an outer bar, and interposed insulation, said inner bar having an inner face contacting with the rail foot and an outer face contacting with said insulation and lying at an angle to said inner face.

In testimony whereof, we have hereunto set our hands.

WILLIAM P. THOMSON.
SAMUEL G. THOMSON.

Witnesses:
S. E. PATTERSON,
McLEOD THOMPSON.